June 17, 1958   R. M. WILLIAMSON   2,838,933
PLURAL TANK LIQUID LEVEL GAUGE
Filed Feb. 16, 1955   2 Sheets-Sheet 1
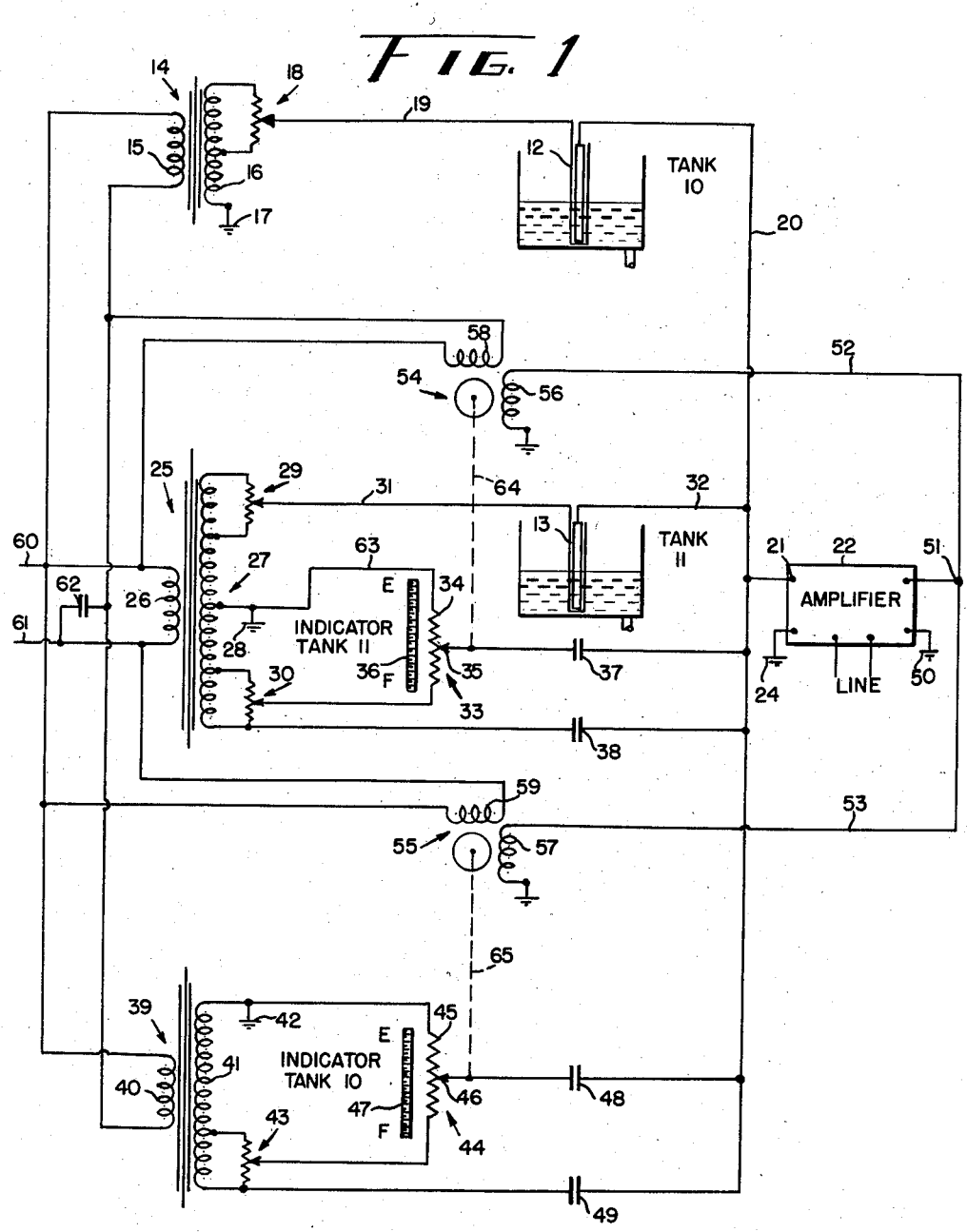
INVENTOR.
REGINALD M. WILLIAMSON

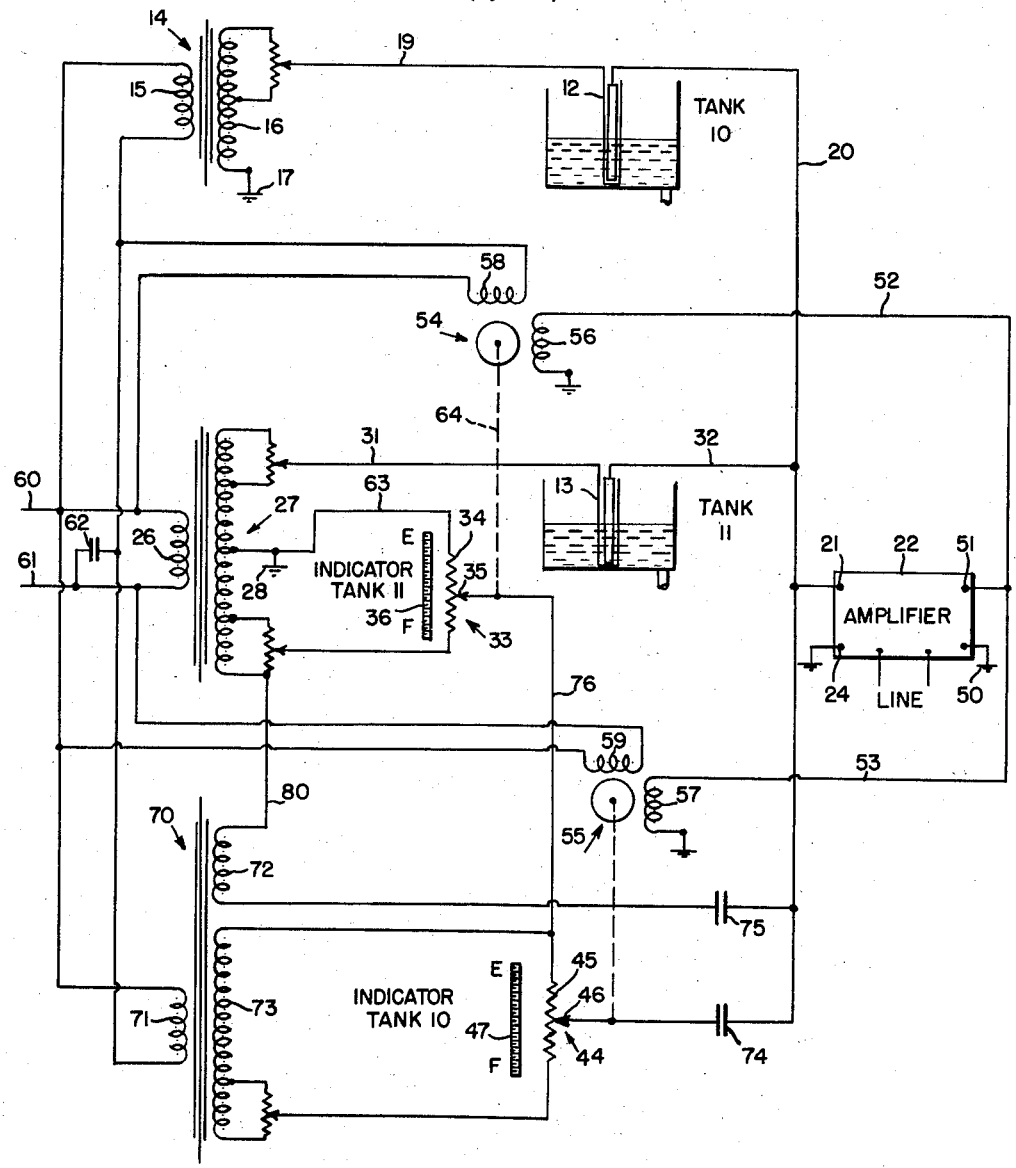

United States Patent Office 2,838,933
Patented June 17, 1958

2,838,933

PLURAL TANK LIQUID LEVEL GAUGE

Reginald M. Williamson, Minneapolis, Minn., assignor to Minneapolis-Honeywell Regulator Company, Minneapolis, Minn., a corporation of Delaware Application February 16, 1955, Serial No. 488,541

11 Claims (Cl. 73—304)

The present invention is concerned with a condition sensing apparatus and more particularly with a liquid quantity indicating apparatus for indicating at separate indicators the quantity of liquid in a plurality of liquid containers.

The present invention is particularly adapted to be used with aircraft wherein a plurality of fuel quantity indicators are provided to indicate the quantity of fuel in a plurality of fuel tanks located throughout the aircraft. It is often necessary to schedule the withdrawing of fuel from the tanks located at different locations in the aircraft for reasons such as to control the center of gravity of the aircraft so that the aircraft will maintain proper flight characteristics. In order to do this it is necessary to sense the quantity of fuel in the individual tanks and in many cases it is desirable to provide a visual indication of this quantity of fuel in the tanks.

The factors which are of prime importance in a control apparatus to be incorporated in an aircraft are the weight of the apparatus, the operativeness of the apparatus, and the cost of the apparatus.

The present invention is concerned with providing a fuel quantity indicating apparatus particularly adapted for use with an aircraft and utilizing a capacitance type quantity sensing means associated with each of a plurality of fuel tanks, including a plurality of voltage sources of different phase relationships, a common amplifier to amplify all of the voltage signals derived from the quantity sensing means, and a plurality of motor means controlled by the amplifier to position a plurality of fuel quantity indicators and to rebalance the input to the amplifier.

Such an apparatus has been arrived at without the sacrificing of accuracy in the fuel quantity indicating apparatus and at the same time achieving a saving in the number of components needed to perform the function, thereby affecting a weight and cost saving. Such an improvement, particularly in the weight of the apparatus, is highly desirable in the case of long range high speed aircraft wherein every pound of weight which is eliminated in auxiliary equipment allows an additional pound of fuel to be carried to extend the range of the aircraft.

It is therefore an object of the present invention to provide an improved liquid quantity measuring apparatus having a plurality of quantity sensing means, a plurality of voltage sources of different characteristics connected to the sensing means, voltage responsive means controlled by the signal from the sensing means, and means controlled by the voltage responsive means to rebalance the voltage applied to the input of the voltage responsive means and to control a plurality of liquid quantity indicators.

A further object of the present invention is to provide an improved liquid quantity indicating apparatus utilizing a plurality of capacitance type quantity sensing means associated with a plurality of liquid containers, a plurality of alternating current voltage sources of different phase relationship, an amplifier to amplify the voltage received from the plurality of quantity sensing means, and a plurality of motors controlled by the output of the amplifier to both indicate the quantity of liquid in each of the individual containers and to control the output voltage of further voltage sources which when fed to the input of the amplifier cause rebalance by opposing the signal received from the plurality of quantity sensing means.

These and other objects of the present invention will become apparent to those skilled in the art upon reference to the following specification, claims and drawings, of which:

Figure 1 is a schematic representation of the present invention, and

Figure 2 is a schematic representation of a modification of the present invention.

Referring specifically to Figure 1, the reference numeral 10 designates a first liquid container while the reference numeral 11 designates a second liquid container. The containers 10 and 11 may be the fuel tanks of an aircraft, and while only two tanks are shown, it is contemplated that any number of tanks could be utilized with the teaching of the present invention.

A capacitance type liquid quantity sensing means 12 is mounted, by means not shown, inside of the tank 10 and is arranged to have a capacitance value which is a function of the quantity of liquid in the tank 10. A second capacitance type liquid quantity sensing means 13 is provided to be mounted in tank 11. The quantity sensing means 12 and 13 may be of the type shown in the Bowar Patent 2,560,757. The sensing means 12 and 13 have a minimum capacitance, called the empty tank capacity, when the tanks 10 and 11 are empty. The capacitance of the sensing means increases to a maximum when the tanks are full.

The reference number 14 designates a transformer having a primary winding 15 and a secondary winding 16, the bottom terminal of which is grounded at ground terminal 17. A calibration potentiometer 18 is provided and connected across an upper portion of the secondary 16. The tap of potentiometer 18 is connected to the quantity sensing means 12 by means of a conductor 19 and the sensing means 12 is connected by means of a conductor 20 to an input terminal 21 of an amplifier 22. A second input terminal of the amplifier 22 is grounded at ground connection 24.

The amplifier 22 is a conventional linear amplifier, that is, it is an amplifier which amplifies an alternating current signal and provides at the output thereof an amplified reproduction of the signal applied to the input terminals of the amplifier.

The reference numeral 25 designates a transformer having a primary winding 26 and a secondary winding 27 which is tapped and grounded at ground connection 28. A calibrating potentiometer 29 is provided and is connected across an upper portion of secondary 27. A further calibration potentiometer 30 is provided and is connected across a lower portion of the secondary 27. The potentiometer tap of potentiometer 29 is connected by means of a conductor 31 to the quantity sensing means 13, which sensing means is connected by means of a conductor 32 to the input terminal 21 of amplifier 22.

The reference numeral 33 designates a potentiometer having a resistance element 34 and a movable tap 35. The movable tap 35 cooperates with an indicator scale 36 to indicate the quantity of liquid in the tank 11. The resistance element of potentiometer 33 is connected one end to ground connection 28 and the other end to the tap of calibrating potentiometer 30.

The reference numeral 39 designates a transformer having a primary winding 40, and a secondary winding 41 which is connected to ground connection 42 at one end thereof. A calibrating potentiometer 43 is connected across a portion of the other end of secondary 41 and has its movable tap connected to resistance element 45 of potentiometer 44. The other end of the resistance element 45 of potentiometer 44 is connected to ground connection 42. Potentiometer 44 is provided with a movable tap 46 which cooperates with a quantity indicator scale 47 and is arranged to indicate the quantity of liquid in the tank 10.

The potentiometer taps 35 and 46 are connected through capacitors 37 and 48 respectively to the input terminal 21 of amplifier 22. Capacitors 38 and 49 are likewise connected to the input terminal 21 of amplifier 22 and are connected to the bottom terminal of secondary 27 and secondary 41 respectively.

The output of amplifier 22 appears between the ground connection 50 and the terminal 51. Terminal 51 is connected by means of conductors 52 and 53 to two phase motors 54 and 55 respectively. The motors 54 and 55 include control windings 56 and 57 and line voltage windings 58 and 59.

Alternating current power is supplied to the control apparatus of Figure 1 by means of power line conductors 60 and 61, which conductors are arranged to be connected to a source of alternating current voltage, not shown. The primary winding 26 is directly connected to the power line conductors 60 and 61 whereas the primary windings 15 and 40 are connected directly to power line conductor 60 and through a phase shifting capacitor 62 to the power line conductor 61. By means of this expedient the voltage applied to primary 26 is 90° out of phase with respect to the voltage applied to the primaries 15 and 40.

The line voltage winding 59 of motor 55 is connected directly to the power line conductors 60 and 61 whereas the line voltage winding 58 of motor 54 is connected to power line conductor 60 and through phase shifting capacitor 62 to power line conductor 61. By means of this expedient the voltage applied to the power line winding 59 of motor 55 is 90° out of phase with respect to the voltage applied to the power line winding 58 of motor 54.

The present invention utilizes the well-known principle that a linear amplifier can be utilized to amplify a plurality of signals of different phase and the output of the amplifier can be utilized to control a plurality of devices which are sensitive to signals of a particular phase. It is this known principle which forms the foundation upon which the present invention is built.

The operation of the apparatus of Figure 1 will now be explained. Considering first the current flow circuits which include the input of amplifier 22, a circuit can be traced from ground connection 17 through transformer secondary 16, conductor 19, sensing means 12, conductor 20, input terminal 21 of amplifier 22, and ground connection 24. This circuit includes a voltage which has been obtained from power line conductors 60 and 61 by means of the phase shifting capacitor 62.

A second circuit can be traced from ground connection 42 through the upper portion of the resistance element of potentiometer 44, capacitor 48, input terminal 21 of amplifier 22, and ground connection 24. The voltage source in this above traced circuit is obtained from secondary 41 and this voltage is likewise obtained from power line conductors 60 and 61 through the phase shifting capacitor 62. However, in the case of this last traced circuit the voltage source is 180° out of phase with respect to the voltage applied in the first above traced circuit from secondary 16. In other words, the current flow in these two traced circuits are such that the currents oppose each other and tend to cancel each other. The magnitude of current in the last traced circuit is determined by the position of the tap 46 of potentiometer 44 and, as will be described, the position of this tap is controlled to cause rebalance of the apparatus.

A third circuit can be traced from ground connection 42 through secondary 41, capacitor 49, input terminal 21 of amplifier 22, and ground connection 24. This circuit is similar in the nature of its current flow to the second traced circuit in that the current flow in this circuit is 180° out of phase with respect to the current flowing through the sensing means 12. Capacitor 49 can be called an empty tank reference capacitor and it is the function of this capacitor in the last traced circuit to provide a current flow which exactly balances out and opposes the current flowing through the sensing means 12 when the tank 10 is empty.

The above three traced circuits comprise the apparatus associated with tank 10 and the current flow through the sensing means 12 is at all times equal and opposite to the current flowing through the capacitors 49 and 48, with the voltage applied to the capacitor 48 being adjustable as will be described.

A fourth circuit can be traced to the input of amplifier 22 by tracing a circuit from ground connection 28 through the upper portion of secondary 27, calibrating potentiometer 29, conductor 31, sensing means 13, conductor 32, input terminal 21 of amplifier 22, and ground connection 24. In this traced circuit it can be seen that the voltage source consisting of secondary 27 is derived directly from the power line conductors 60 and 61.

A fifth circuit can be traced from ground connection 28 through conductor 63, the upper portion of the resistance element 34 of potentiometer 33, tap 35, capacitor 37, input terminal 21 of amplifier 22, and ground connection 24. The voltage source in this circuit consists of secondary 27 which derives its voltage directly from power line conductors 60 and 61. However, in this case the voltage is 180° out of phase with respect to the voltage applied to sensing element 13, which has been described in the fourth traced circuit. The current flow through capacitor 37 is determined by the position of potentiometer tap 35 and, as will be described, potentiometer tap 35 is positioned to cause the current flow from sensing means 13, due to liquid in the tank 10, to be cancelled out in the input of amplifier 22.

A sixth current flow circuit can be traced from ground connection 28 through the bottom portion of secondary 27, capacitor 38, input terminal 21 of amplifier 22, and ground connection 24. As in the fifth traced circuit, the voltage in the instant circuit is 180° out of phase with the voltage applied to the sensing means 13. The capacitor 38 may be called an empty tank reference capacitor and serves the function of providing a current in the instant circuit which is equal and opposite to the current which is received at the input amplifier 22 from sensing means 13 when the tank 11 is empty.

The above traced circuits, all of which include the input of amplifier 22, are effective to apply electrical currents to the input of the amplifier 22 which currents appear in amplified form at the output thereof. The output of amplifier 22 is connected to the control windings 56 and 57 of two phase motors 54 and 55 respectively. Since the line voltage winding 58 of motor 54 is connected to the power line conductors 60 and 61 through the phase shifting capacitor 62, this motor is responsive only to electrical currents which are 90° or 270° out of phase with the voltage derived through the phase shifting capacitor 62. A 90° current is derived from the sensing means 13 while a 270° current is derived from the capacitors 37 and 38. Therefore, the combination of the currents from the sensing means 13, and the capacitors 37 and 38 is effective to cause the motor 54 to be energized and through the linkage shown by broken line 64 the position of potentiometer tap 35 is adjusted to cause the 90° current and the 270° current to be equal. When this condition exists, the potentiometer tap 35 in cooperation with the indicator scale 36 indicates the quantity of liquid in the tank 11.

Since the line voltage winding 59 of motor 55 is directly connected to the power line conductors 60 and 61, the motor 55 is responsive to signal currents applied to the control winding 57 which are 90° or 270° out of phase with respect to the voltage applied to power line conductors 60 and 61. Such a 90° current is obtained from sensing means 12 and a 270° current is obtained from capacitors 48 and 49. Motor 55, by means of a mechanical connection represented by the broken line 65, is effective to control the position of the potentiometer tap 46 and thereby cause the 270° component of current to be equal and opposite to the 90° component of current. When such a condition exists the potentiometer tap 46 in cooperation with the indicating scale 47 indicates the quantity of liquid in the tank 10.

The apparatus of Figure 2 is similar to the apparatus of Figure 1 and provides a modification whereby a single empty tank reference capacitor 75 is substituted for the empty tank reference capacitor 38 and 49 of Figure 1. Also, a transformer 70 replaces the transformer 39 of Figure 1. The primary 71 of the transformer 70 is connected, as is the primary 40 of Figure 1, to the power line conductor 60 and through a phase shifting capacitor 62 to the power line conductor 61. The transformer 70 has a secondary winding 72 and a secondary winding 73. The potentiometer 44 is connected across the secondary 73 and the upper terminal of the resistance element of potentiometer 44 is connected by means of a conductor 76 to the movable tap 35 of potentiometer 33.

Operation of the apparatus of Figure 2 will now be explained. Four current flow circuits can be traced which include the input of amplifier 22. The first of these circuits can be traced from ground terminal 17 through secondary 16, conductor 19, sensing means 12, conductor 20, input terminal 21 of amplifier 22 and ground connection 24. As in Figure 1, the voltage in this above traced circuit is obtained through the phase shifting capacitor 62.

A second circuit can be traced from ground connection 28 through the upper portion of secondary 27, conductor 31, sensing means 13, conductor 32, input terminal 21 of amplifier 22, and ground connection 24. This circuit is similar to a circuit in Figure 1 and the voltage in this circuit obtained from secondary 27 is 90° out of phase with respect to the voltage of secondary 16.

The magnitude of the current in the two above traced circuits is dependent upon the quantity of liquid in the tanks 10 and 11 respectively.

A third circuit can be traced from ground terminal 28 through conductor 63, the upper portion of the resistance element 34 of potentiometer 33, tap 35, conductor 76, the upper portion of the resistance element 45 of potentiometer 44, tap 46, capacitor 74, input terminal 21 of amplifier 22 and ground connection 24. In this circuit it can be seen that there are two voltage sources. A first voltage source is obtained from the lower portion of secondary 27 and it can be seen that this voltage is 180° out of phase with the voltage in the second above traced circuit. The second voltage source is obtained from the secondary 73 of transformer 70 and it can be seen that this voltage is 180° out of phase with the voltage obtained from the first above traced circuit including sensing means 12. Therefore, by proper adjustment of the potentiometer taps 35 and 46 the magnitude of the current flow in the third above traced circuit can be made equal and opposite to the current flow through the sensing means 12 and 13 respectively which is due to fluid in the tanks 10 and 11. The potentiometer taps 35 and 46 are controlled by the motors 54 and 55 respectively in the same manner as described in connection with Figure 1.

A fourth circuit can be traced including the input of amplifier 22 from ground connection 28 through the lower portion of secondary 27, conductor 80, secondary 72, capacitor 75, input terminal 21 of amplifier 22, and ground connection 24. In this circuit it can be seen that there are two voltage sources. A first voltage source is the lower portion of secondary 27 and this voltage is 180° out of phase with the voltage applied to the sensing element 13. A second voltage source is the secondary 72 and since the primary of transformer 70 receives its energization through the phase shifting capacitor 62 it can be seen that this voltage is 180° out of phase with the voltage applied to the sensing means 12. The capacitor 75 is an empty tank reference capacitor and performs the function of the capacitors 38 and 49 of Figure 1, namely, the current flow through the capacitor 75 is of a magnitude to balance out the empty tank capacitance value of the sensing means 12 and 13.

As has been pointed out in connection with Figure 1, the output of amplifier 22 is applied to the control windings 56 and 57 of the motors 54 and 55 respectively and the potentiometer taps 35 and 46 are controlled by these motors to cause the current flowing through the capacitor 74 to be equal and opposite to the current flowing through the sensing means 12 and 13 due to liquid in the tanks 10 and 11. The potentiometer taps 35 and 46 cooperate with the indicator scales 36 and 47 respectively to indicate independently the quantity of liquid in the tanks 10 and 11.

From the above description it can be seen that an improved fuel quantity indicating apparatus has been provided utilizing a minimum number of components to both reduce the weight of the control apparatus and reduce the cost thereof. While these and other modifications of the present invention will be apparent to those skilled in the art, it is intended that the scope of the present invention be limited solely by the appended claims.

I claim as my invention:

1. Fluid quantity indicating apparatus, comprising: a plurality of bridge circuits each having a capacitance fluid quantity sensing element and a rebalance capacitance arm including fluid quantity indicating means, each of said bridge circuits being associated with a different fluid container, a plurality of alternating current voltage sources each of which possesses a different characteristic peculiar to alternating current connected one source to each of said bridge circuits to supply an operating voltage thereto, an electronic amplifier having an input and an output, means connecting the input of said amplifier to the output of each of said plurality of bridge circuits, and a plurality of drive means each of which is sensitive to a voltage which possesses a different one of said characteristics peculiar to alternating current and is arranged with the rebalance arm of one of the bridge circuits to cause the bridge to be balanced, said indicating means indicating the quantity of fluid in each individual container.

2. Liquid quantity sensing means for use with a plurality of individual fuel containers, comprising: a plurality of impedance type liquid quantity sensing means each of which is adapted to be mounted in an individual one of the plurality of fuel containers, a first plurality of voltage sources each having a different characteristic which is independent of the magnitude thereof and each of which is connected to an individual one of said quantity sensing means, a second plurality of voltage sources each of which has an output voltage which opposes the voltage of an individual one of said first plurality of sources, a voltage responsive means connected to said plurality of sensing means and to said second plurality of voltage sources to be controlled by the voltages therefrom, a plurality of means each of which is responsive to a different one of said characteristics and controlled by said voltage responsive means to control the magnitude of the output voltage of each of said second plurality of voltage sources in accordance with the quantity of liquid in an individual container, and a plurality of liquid quantity indicator means each one of which is individually controlled by said means controlled by said voltage responsive means.

3. Liquid quantity indicating apparatus for use with two liquid containers, comprising: first liquid quantity sensing means adapted to be associated with the first liquid container to derive a signal of a first sense and of a magnitude indicative of the quantity of liquid in the first container, a first signal source of a sense opposite to said first sense and of a controlled magnitude; second liquid quantity sensing means adapted to be associated with the second liquid container to derive a signal of a second sense and of a magnitude indicative of the quantity of liquid in the second container, a second signal source of a sense opposite to said second sense and of a controlled magnitude; signal responsive means, a means connecting said first and second sensing means and said first and second signal sources to said signal responsive means to control said signal responsive means, a plurality of means each of which is responsive to one of said senses controlled by said signal responsive means and connected to said first and second signal source to control the magnitudes thereof to cause said signal of said first sense and of the opposite sense to be equal and to cause said signal of said second sense and of the opposite sense to be equal, and a first and a second liquid quantity indicator controlled by said means controlled by said signal responsive means.

4. Liquid quantity indicating apparatus for use with a first and a second liquid container, comprising: a first and second capacitance type liquid quantity sensing means adapted to be associated with the first and second containers respectively, a first and a second source of alternating current of different phases, means connecting said first sensing means to said first source and said second sensing means to said second source, a third and a fourth source of alternating current of variable output and each being of a phase opposite to the phases of said first and second sources respectively, capacitance means connected to said third and fourth source, amplifier means having an input connected to said first and second sensing means and to said capacitance means, first and second motor means connected in the output of said amplifier and arranged to be sensitive only to said first and the opposite phase and to said second and the opposite phase respectively and arranged to control the output voltage of said third and fourth sources, and a first and a second liquid quantity indicator controlled by said first and second motor means respectively to indicate the quantity of liquid in the first and second containers.

5. Control apparatus for use with a first and a second liquid container comprising: a first and a second source of alternating current voltage of a first and a second phase, a third and fourth source of alternating current voltage each of a phase opposite to said first and second phases respectively, a first and a second capacitance type liquid quantity sensing means arranged to be associated with the first and second containers respectively and connected to said first and second sources of voltage respectively, a first and a second capacitor connected to said third and fourth source of voltage respectively through a variable voltage connection, an electronic amplifier having an input and an output, means connecting said first and second sensing means and said first and second capacitors to said amplifier input, a first and a second motor connected to said amplifier output and arranged so that said first motor is reversibly controlled by only a voltage of said first or an opposite phase and said second motor is reversibly controlled by only a voltage of said second or an opposite phase, means connecting said first motor to control the variable voltage connection of said first capacitor to said third source of voltage, means connecting said second motor to control the variable voltage connection of said second capacitor to said fourth source of voltage, and a first and a second indicator controlled by said first and second motors respectively to indicate the quantity of liquid in the first and second containers.

6. Control apparatus for use with a first and a second liquid container comprising: a first and a second source of alternating current voltage of a first and a second phase, a third and a fourth source of alternating current voltage each of a phase opposite to said first and second phases respectively, a first and a second capacitance type liquid quantity sensing means arranged to be associated with the first and second containers respectively and connected to said first and second sources of voltage respectively, a first and a second potentiometer each having a movable tap and having a resistance element connected to said third and fourth source of voltage respectively, means connecting said first potentiometer tap to said second potentiometer resistance element, a capaictor connected to said second potentiometer tap, an electronic amplifier having an input and an output, means connecting said first and second sensing means and said capacitor to said amplifier input, a first and a second motor connected to said amplifier output and arranged so that said first motor is reversibly controlled by only a voltage of said first or an opposite phase and said second motor is reversibly controlled by only a voltage of said second or an opposite phase, means connecting said first motor to control said first potentiometer tap, means connecting said second motor to control said second potentiometer tap, and first and second indicator means associated with said first and second motors respectively to indicate the quantity of liquid in the first and second containers.

7. Control apparatus for use with a first and a second liquid container comprising: a first and a second source of alternating current voltage of a first and a second phase, a third and a fourth source of alternating current voltage each of a phase opposite to said first and second phases respectively, a first and a second capacitance type liquid quantity sensing means arranged to be associated with the first and second container respectively and connected to said first and second sources of voltage respectively, a first and a second capacitor connected to said third and fourth source of voltage respectively through a variable voltage connection, an electronic amplifier having an input and an output, means connecting said first and second sensing means and said first and second capacitors to said amplifier input, a first and a second motor connected to said amplifier output and arranged so that said first motor is reversibly controlled by only a voltage of said first or an opposite phase and said second motor is reversibly controlled by only a voltage of said second or an opposite phase, means connecting said first motor to control the variable voltage connection of said first capacitor to said third source of voltage means connecting said second motor to control the variable voltage connection of said second capacitor to said fourth source of voltage, a first and a second indicator controlled by said first and second motor respectively to indicate the quantity of liquid in the first and second container, further capacitance means connected to voltage means having a phase component opposite to said first phase and a phase component opposite to said second phase, and means connecting said further capacitance means to said amplifier input to oppose the voltage from said first and second sensing means when the first or second container is empty.

8. Control apparatus for use with a first and a second liquid container comprising: a first and a second source of alteranting current voltage of a first and a second phase, a third and a fourth source of alternating current voltage each of a phase opposite to said first and second phases respectively, a first and a second capacitance type liquid quantity sensing means arranged to be associated with the first and second containers respectively and connected to said first and second sources of voltage respectively, a first and a second potentiometer each having a movable tap and having a resistance element connected to said third and fourth source of voltage respectively, means connecting said first potentiometer tap to said second potentiometer resistance element, a capacitor connected to said second potentiometer tap, an electronic amplifier having an input and an output, means connecting said first and second sensing means and said capacitor to said amplifier input, a first and a second motor connected to said amplifier output and arranged so that said first motor is reversibly controlled by only a voltage of said first or an opposite phase and said second motor is reversibly controlled by only a voltage of said second or an opposite phase, means connecting said first motor to control said first potentiometer tap, means connecting said second motor to control said second potentiometer tap, first and second indicator means associated with said first and second motors respectively to indicate the quantity of liquid in the first and second containers, further capacitance means connected to voltage means having a phase component opposite to said first phase and a phase component opposite to said second phase, and means connecting said further capacitance means to said amplifier input to oppose the voltage from said first and second sensing means when the first or second container is empty.

9. Fluid quantity sensing apparatus for use with a first and a second fluid container to indicate the quantity of fluid in each container, comprising: a first and a second capacitance type fluid quantity sensing means associated with the first and second containers, respectively, a first and a second alternating current source of voltage of a first and a second phase respectively, means including said first and second sensing means and said first and second source of voltage arranged to derive an electrical signal of a first phase and an electrical signal of a second phase indicative of the quantity of fluid in the first and second container respectively, signal amplifying means having an input and an output, means connecting said input to said means including said first and second sensing means to apply said electrical signals of said first and second phase thereto, first and second indicator means responsive to a signal of said first and second phase respectively, and means connecting said output to said first and second indicator means to cause said first and second indicator means to indicate the quantity of fluid in the first and second container respectively.

10. Fluid quantity indicating apparatus for use with a plurality of fluid containers, comprising: first fluid quantity sensing means adapted to be associated with a first fluid container to derive a first signal having a first electrical characteristic and of a magnitude indicative of the quantity of liquid in the first container, a first rebalance signal source of a phase opposite to the phase of said first signal and of a controlled magnitude; second liquid quantity sensing means adapted to be associated with a second fluid container to derive a second signal having a second electrical characteristic capable of being distinguished from said first characteristic and of a magnitude indicative of the quantity of fluid in the second container; a second rebalance signal source having a phase opposite to the phase of said second signal and of a controlled magnitude; a signal responsive means; means connecting said first and second sensing means and said first and second rebalance signal sources to said signal responsive means to control said signal responsive means; a plurality of actuator means each of which is responsive to signals of one only of said characteristics controlled by said signal responsive means and connected to said first and second rebalance signal sources to control the magnitude thereof to rebalance said first and second signals respectively; and a first and second fluid quantity indicator means controlled by said actuator means.

11. Condition indicating apparatus for use with a plurality of conditions to be sensed, comprising: a first condition sensing means adapted to be associated with a first of the conditions to be sensed to derive a first signal of a first electrical characteristic and of a magnitude indicative of the first condition sensed; a first rebalance signal source of a phase opposite to the phase of said first signal and of a controlled magnitude; second condition sensing means adapted to be associated with a second of the conditions to be sensed to derive a second signal of a second electrical characteristic and of a magnitude indicative of the second condition sensed; a second rebalance signal source of a phase opposite to the phase of said second signal and of a controlled magnitude; a signal responsive means; means connecting said first and second sensing means and said first and second signal sources to said signal responsive means to control said signal responsive means; a plurality of motive means each of which is responsive to signals of one only of said characteristics controlled by said signal responsive means and connected to said first and second rebalance signal sources to control the magnitude thereof to rebalance said first and second signals respectively; and a first and a second condition indicator means controlled by said motive means.

References Cited in the file of this patent

UNITED STATES PATENTS

| | | |
|---|---|---|
| 2,563,280 | Schafer | Aug. 7, 1951 |
| 2,638,000 | Sontheimer | May 12, 1953 |

OTHER REFERENCES

Publication by Schafer, "Airplane Fuel Gage," in Electronics, April 1950, pp. 77, 78 and 79.